(12) United States Patent
Eum

(10) Patent No.: US 7,653,343 B2
(45) Date of Patent: Jan. 26, 2010

(54) DIGITAL MULTIMEDIA BROADCASTING SYSTEM AND METHOD FOR MANAGING MULTIMEDIA BROADCAST CHANNELS

(75) Inventor: Hye Won Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 11/446,087

(22) Filed: Jun. 1, 2006

(65) Prior Publication Data
US 2007/0040937 A1    Feb. 22, 2007

(30) Foreign Application Priority Data
Jun. 3, 2005    (KR) .................... 10-2005-0047653

(51) Int. Cl.
*H04Q 7/20*    (2006.01)
(52) U.S. Cl. ............. 455/3.02; 455/3.03; 455/3.01; 455/3.06; 455/445; 455/414.1
(58) Field of Classification Search ............... 455/3.02, 455/3.03, 3.01, 3.06, 422.1, 414.1, 414.2, 455/414.3, 445, 466, 418–420, 2.01, 550.1
See application file for complete search history.

(56) References Cited

U.S. PATENT DOCUMENTS

| | | | |
|---|---|---|---|
| 6,016,107 A * | 1/2000 | Kampe et al. | 340/7.46 |
| 2003/0101453 A1 * | 5/2003 | Matsuyama et al. | 725/40 |
| 2005/0270994 A1 * | 12/2005 | Caloud et al. | 370/312 |
| 2007/0118614 A1 * | 5/2007 | Bertin | 709/219 |

FOREIGN PATENT DOCUMENTS

| | | |
|---|---|---|
| DE | 100 37 940 A1 | 2/2001 |
| EP | 0 818 900 A2 | 7/1997 |
| EP | 1 447 929 A1 | 2/2004 |
| JP | 2003-037518 | 2/2003 |
| JP | 2004-253829 | 9/2004 |
| KR | 1020060122159 | 11/2006 |

OTHER PUBLICATIONS

ETSI: "ETSI TR 101 496-2 V1.1.2" May 2001, European Telecommunications Standards Institute, Sophia Antipolis, France, XP002445112.

* cited by examiner

*Primary Examiner*—Keith T Ferguson
(74) *Attorney, Agent, or Firm*—Lee, Hong, Degerman, Kang & Waimey

(57) ABSTRACT

A method for managing a digital multimedia broadcasting channel includes receiving a broadcast data frame that includes an occurrence change field, and performing a service update responsive to reconfiguration version data defined within the occurrence change field. Alternatively, the method includes transmitting a broadcast data frame that includes an occurrence change field, and causing a receiving terminal to perform a service update for a new channel responsive to reconfiguration version data defined within the occurrence change field. A digital multimedia broadcast terminal includes a receiver for receiving a broadcast data frame that includes an occurrence change field, and a controller configured to generate a control signal causing a service update responsive to reconfiguration version data defined within the occurrence change field.

17 Claims, 5 Drawing Sheets

DIGITAL MULTIMEDIA BROADCASTING SYSTEM AND METHOD FOR MANAGING MULTIMEDIA BROADCAST CHANNELS

CROSS-REFERENCE TO RELATED APPLICATIONS

Pursuant to 35 U.S.C. §119(a), this application claims the benefit of earlier filing date and right of priority to Korean Application No. 10-2005-0047653, filed on Jun. 3, 2005, the contents of which are hereby incorporated by reference herein in their entirety.

BACKGROUND OF THE INVENTION

1. Field of the Invention

The present invention relates to digital multimedia broadcasting (DMB), and in particular to managing digital broadcasting channels in a DMB system.

2. Discussion of the Related Art

High-quality digital audio devices, such as compact discs (CDs) and digital versatile discs (DVDs), have increased in acceptance and popularity throughout the world. Consequently, listeners of digital broadcasts have demanded that such broadcasts provide audio at quality that equals that of CDs and DVDs. Digital audio broadcasting (DAB) systems have been widely used to obviate limitations in the quality of audio available from typical amplitude modulation (AM) and frequency modulation (FM) broadcast services.

DAB is a technology that is currently implemented in various countries such as Europe, Canada, and the United States. A DAB system implements technology which differs from that of conventional AM and FM broadcasting systems, and is able to provide robust, high-quality, signals which are readily received by both stationary and mobile receivers.

In recent times, a variety of multimedia services include both audio and video data using a digital multimedia broadcasting (DMB) service. A typical DMB service can provide users with high-quality audio and video data. The Eureka-147 system has been developed for the above-mentioned DAB service, and has been utilized to provide content using DMB.

A single ensemble, which is one of the many types of broadcast signals in the DAB system, is composed of one or more services. A single service is composed of one or more service components. Individual sub-channels or fast information data channels (FIDCs) may be used for each of these service components.

Multiplex configuration information (MCI) identifies services multiplexed into the ensemble, service components contained in individual services, and position information of the service components. The MCI forms part of the main service channel (MSC), which is repeatedly broadcast and subsequently received by a receiving device, such as a terminal. The terminal utilizes the received MCI to interpret the MSC.

The term reconfiguration will be used herein to refer to a change in an ensemble structure of a received broadcast signal. Typically, the receiving terminal is readied for a change to a new ensemble prior to the actual reconfiguration process. This may be accomplished by transmitting new MCI (i.e., information regarding the reconfiguration) to the receiving terminal at a point of time prior to the actual occurrence of the reconfiguration process. As an example, the MCI may be broadcast to the receiving terminal about six seconds before the reconfiguration actually occurs.

During reconfiguration, one or more changes may occur. For instance, the reconfiguration may change the number of services that make up the ensemble, the structure of the service components, the configuration within an ensemble structure, and combinations thereof.

FIG. 1 depicts a reconfiguration in which the number of services within an ensemble structure is increased from three to four services. The original services include sports, movies, and radio. The reconfiguration provides for the addition of the news service.

FIG. 2 depicts a reconfiguration in which the number of services within an ensemble structure is decreased from three to two services. Another reconfiguration possibility would be for the number of services to remain the same, but the sub-channel which belongs to a particular service may be changed to another sub-channel. This channel switching may be performed for one or more of the services of the ensemble structure.

A user is typically unaware of changes to the ensemble structure until they are notified of the reconfiguration. The user therefore only realizes the addition or deletion of a service, resulting from received channel information, after changes in the structure of the ensemble has occurred. In addition, conventional techniques usually permit obtaining the relevant ensemble change information only when actively displaying a particular service. There is currently no viable technique for obtaining the relevant information when changing non-active configurations of the ensemble. Periodically performing fast information channel (FIC) decoding has previously been proposed to solve the problem. However, this solution requires performing FIC decoding in fade areas.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof, as well as the appended drawings.

In accordance with an embodiment, a method for managing a digital multimedia broadcasting channel includes receiving a broadcast data frame that includes an occurrence change field, and performing a service update responsive to reconfiguration version data defined within the occurrence change field.

In one aspect, the broadcast data frame is implemented as a fast information group (FIG) type 0 field for extension 0 frame, and the occurrence change field is 8 bits. If desired, the broadcast data frame further includes a change flag, and the method further includes initiating the performing of the service update whenever a value of the reconfiguration version data is different than a previous value of the reconfiguration version data, and a value of the change flag is zero.

In another aspect, the method further includes initiating the performing of the service update whenever a value of the reconfiguration version data is different than a previous value of the reconfiguration version data.

In yet another aspect, the method further includes extracting the reconfiguration version data from the occurrence change field.

In still yet another aspect, the method further includes storing the new channel in memory.

In accordance with an alternative embodiment, a method for managing a digital multimedia broadcasting channel includes transmitting a broadcast data frame that includes an occurrence change field and causing a receiving terminal to perform a service update responsive to reconfiguration version data defined within the occurrence change field.

In accordance with yet another alternative embodiment, a digital multimedia broadcast terminal includes a receiver for receiving a broadcast data frame that includes an occurrence change field, and a controller configured to generate a control signal causing a service update responsive to reconfiguration version data defined within the occurrence change field.

In one embodiment, a digital multimedia broadcasting system includes a data generator for selectively storing reconfiguration version data within an occurrence change field of a broadcast data frame, such that a value of the reconfiguration version data is varied to cause a receiving terminal to perform a service update. The system further includes a transmitter for transmitting the broadcast data frame to the receiving terminal.

Another embodiment is directed toward a method for generating a broadcast data frame for a terminal operating within a digital multimedia broadcast system. The method includes defining an occurrence change field in the broadcast data frame and varying values of reconfiguration version data defined within the occurrence change field to cause the terminal to perform a service update.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
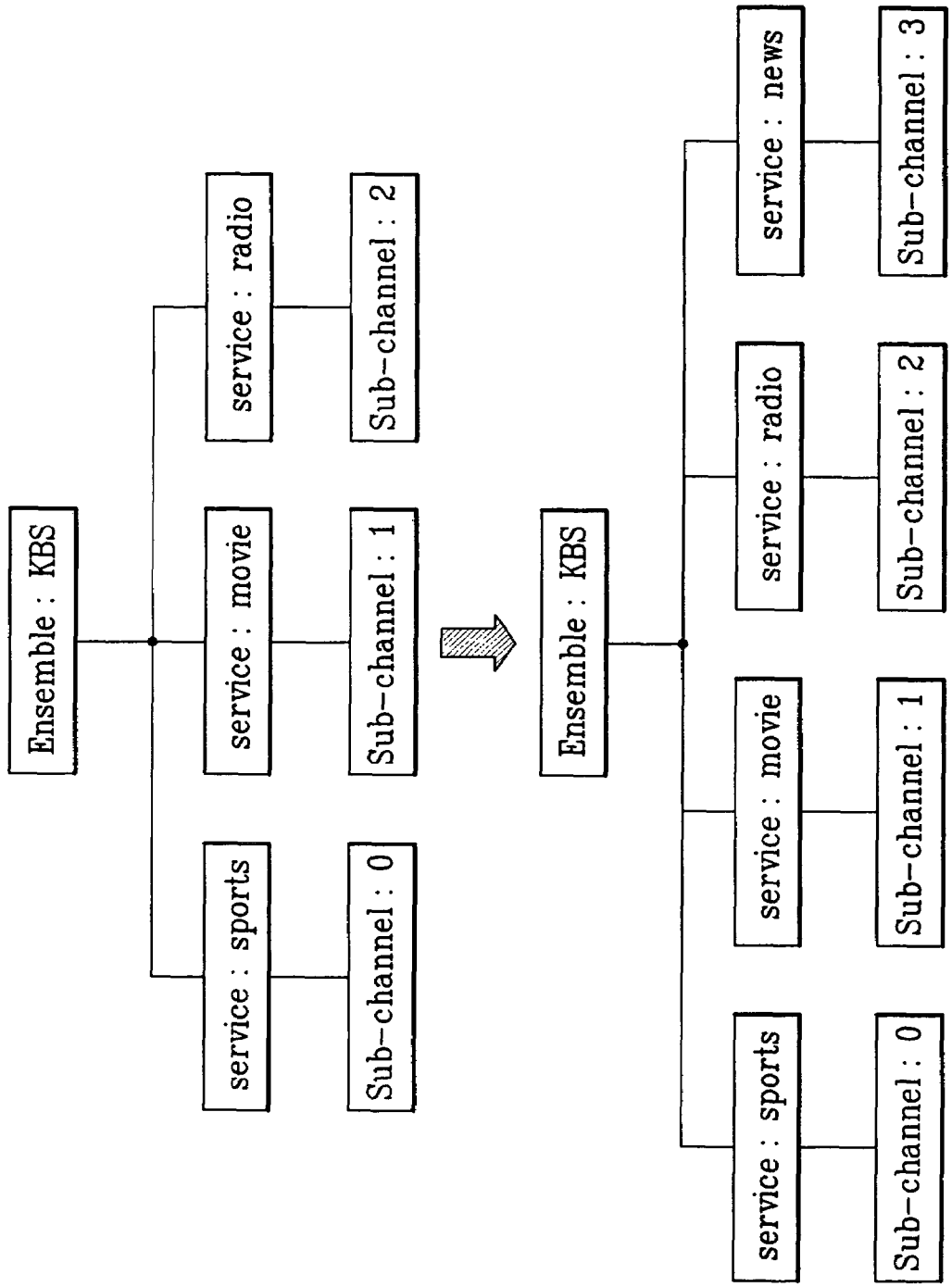
FIG. 1 depicts a reconfiguration in which the number of services within an ensemble structure is increased from three to four services.
Figure 2:
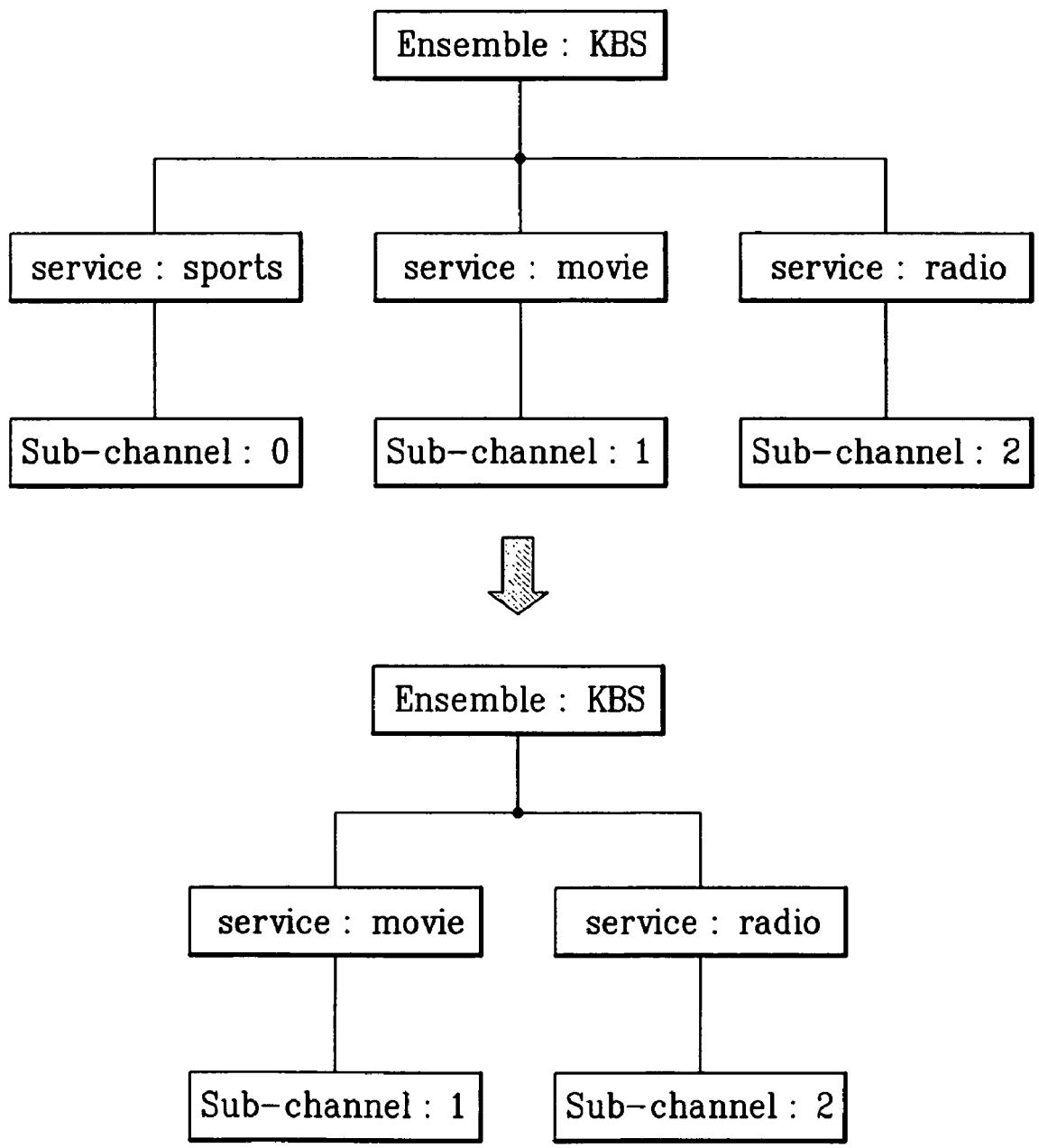
FIG. 2 depicts a reconfiguration in which the number of services within an ensemble structure is decreased from three to two services.
Figure 3:
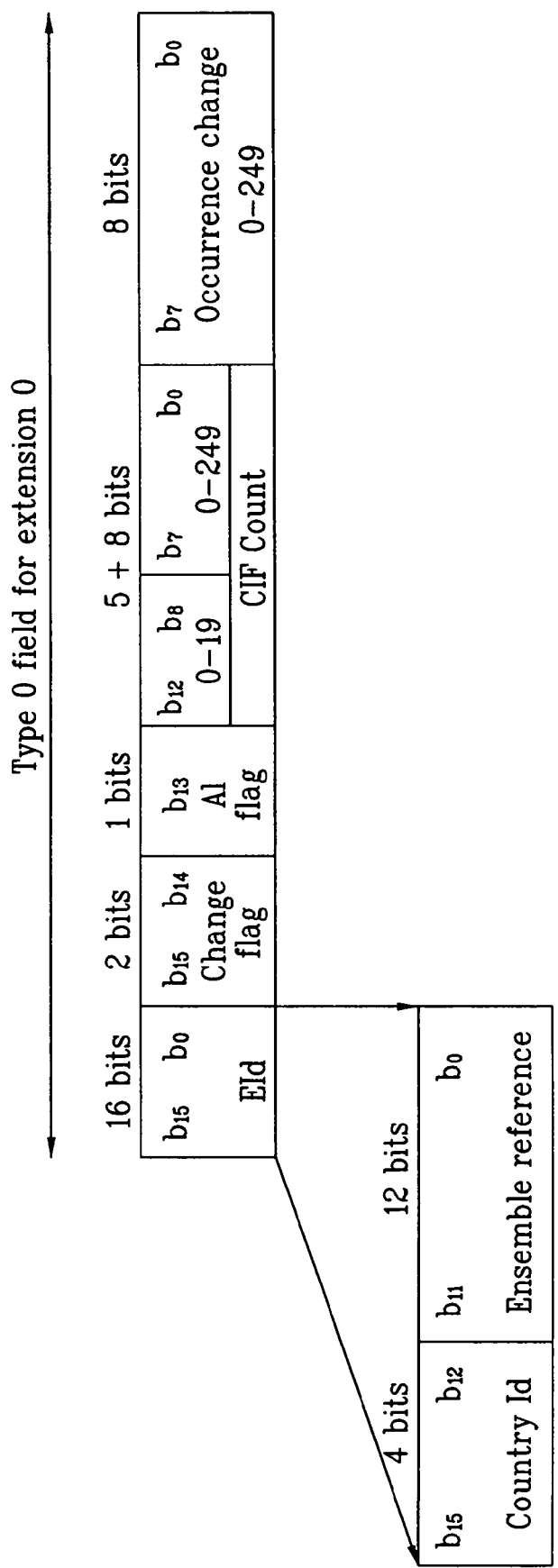
FIG. 3 depicts a broadcast data frame of a fast information group (FIG) type 0 field extension 0 (also referred to herein as FIG 0/0) in accordance with the Eureka-147 standard.

FIG. 3 depicts a broadcast data frame of a fast information group (FIG) type 0 field extension 0 (also referred to herein as FIG 0/0) in accordance with the Eureka-147 standard. By way of example only, ensemble information is coded at FIG 0/0, each field being described as follows.

EId (Ensemble Identifier): Includes a total of 16 bits, with 4 bits representing country ID), and 12 bits representing an ensemble reference.

Change flag: Includes 2 bits which provide notice of changes in the sub-channel and/or service configuration. Possible change flags are set forth in Table 1 below.

TABLE 1

| b15 | b14 | Remarks |
|-----|-----|---------|
| 0 | 0 | no change, no occurrence change field present |
| 0 | 1 | sub-channel organization only |
| 1 | 0 | service organization only |
| 1 | 1 | sub-channel organization and service organization |

A1 flag: Includes a 1 bit flag which is used to indicate an accessible alarming message, along with an ensemble. A value "0" indicates an inaccessible alarming message and a value "1" indicates an accessible alarming message.

CIF count: The higher order portion of the CIF count field includes a modulo-20 counter (0 to 19) and the lower order portion of the CIF count includes a modulo-250 counter (0 to 249).

Occurrence change: Includes an 8 bit field which is for an occurrence change, and represents the lower part of the CIF counter. This particular field is implemented in accordance with the present invention to indicate a service update. The occurrence change field is often used in conjunction with the change flag field (e.g., setting the change flag to 0). The reason that the occurrence change field is used to transmit the reconfiguration version data is because the occurrence change filed is not otherwise used in many instances.

Reconfiguration is a method by which the broadcast station provides notice of configuration changes to receiving terminals, for example. As will be described in more detail below, reconfiguration notification may be accomplished by increasing the value of the reconfiguration version data, which may be transmitted in the occurrence change field in accordance with an embodiment. More specifically, the broadcast station may incrementally increase an 8 bit value of the reconfiguration version data from 0-255 using a modular-256 operation whenever a reconfiguration occurs. If desired, reconfiguration version data within the occurrence change field may be sent to the terminal prior to the time (e.g., six seconds) that the actual reconfiguration process occurs. This aspect provides advance notice to the terminal of the reconfiguration of the ensemble.

In accordance with an embodiment, the broadcast station transmits reconfiguration version data using the change flag and the occurrence change field. A terminal receives and then compares the value of the transmitted version data with a previous value of the version data. A service update may be performed if the previous and current values of the reconfiguration version data has changed, and the change flag has a value of 0. The terminal does not conduct a service update (e.g., a channel search) when the transmitted version data is identical to a previous value of the version data. The terminal typically performs a new channel configuration by searching for a service within an ensemble.

Figure 4:
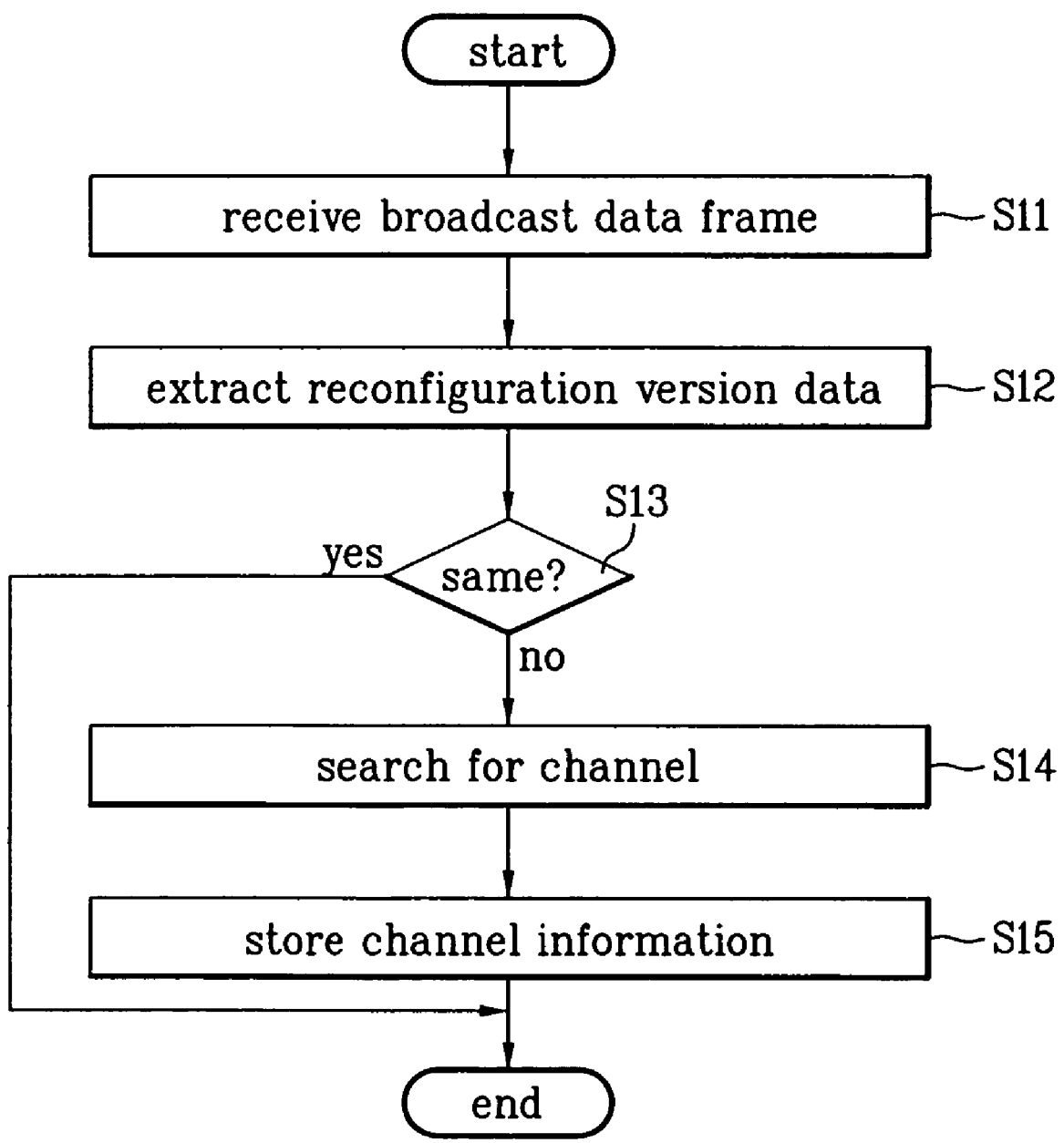
FIG. 4 is a flowchart depicting a method for providing digital multimedia broadcast channel management in accordance with an embodiment of the present invention.

FIG. 4 is a flowchart depicting a method for providing digital multimedia broadcast channel management in accordance with an embodiment of the present invention. By way of nonlimiting example only, this method will be described with reference to the broadcast data frame depicted in FIG. 3.

First of all, it is to be understood that a terminal is located within the coverage area of a digital multimedia broadcast system. At some point, the broadcast system transmits a broadcast data frame which includes reconfiguration version data. In an embodiment, the reconfiguration version data is implemented using the 8 bit occurrence change field. As an additional parameter, a value of the change flag of the broadcast data frame may also be set to 0.

At block S11, the terminal receives the broadcast data frame and included reconfiguration version data. At block S12, the value of the reconfiguration version data is extracted or otherwise determined. The value of the extracted reconfiguration version data may then be compared with the value of previously received reconfiguration version data. Whether or not a service update is necessary may be determined responsive to the relative differences between the current and previous values of the reconfiguration version data. For instance, if the current and previous values of the version data are the same, this indicates that a service update is not required. On the other hand, if these values are different, this indicates that a service update is desired. In an embodiment, a service update is indicated only if there is a change in the reconfiguration version data and the value of the change flag is set to a particular value (e.g., zero).

According to decision block S13, if the current and previous values are equal, no service update is required and operations are terminated. On the other hand, if these values are not equal, a service update or change is desired and control flows to block S14.

At block S14, a service update process is performed during which a search for the new channel, for example, is performed. Once the channel is located, the channel information may be stored in memory (block S15). The various operations depicted in FIG. 4 may be repeated on a continuous, periodic, or other basis.

Figure 5:
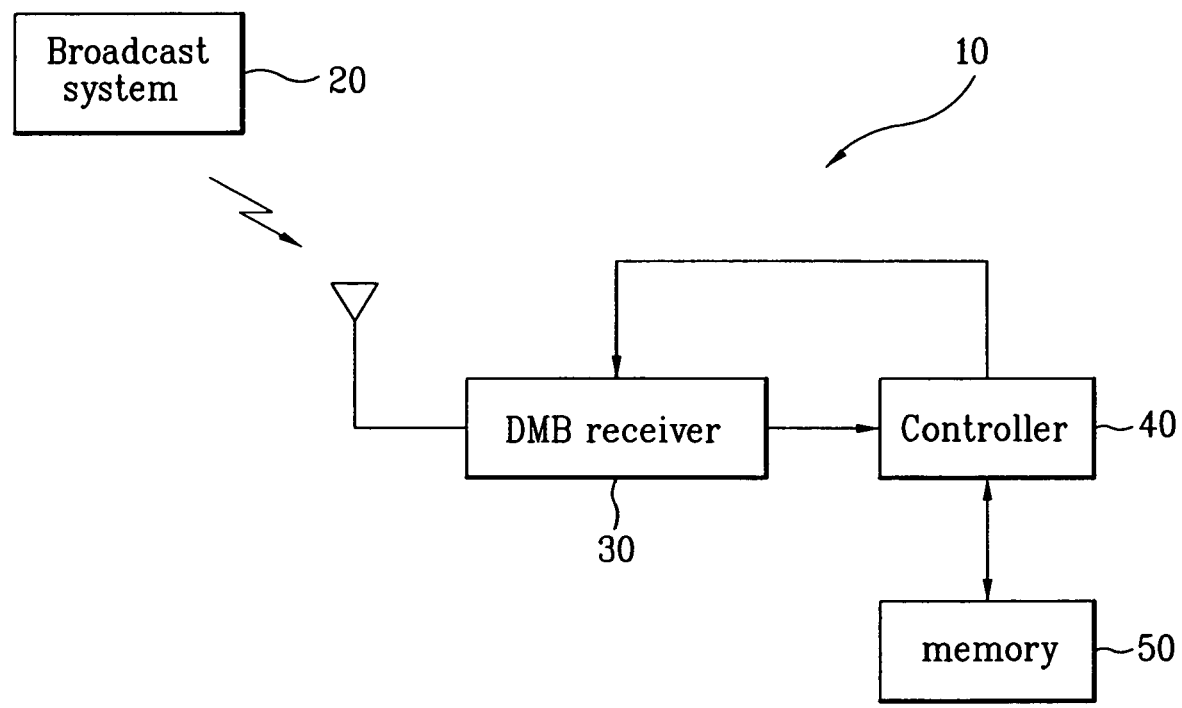
FIG. 5 is a schematic block diagram depicting relevant components of a typical terminal configured in accordance with an embodiment of the present invention to function in cooperation with a digital multimedia broadcasting system.

FIG. 5 is a schematic block diagram depicting relevant components of terminal 10 configured in accordance with an embodiment of the present invention to function in cooperation with digital multimedia broadcast system 20.

Broadcast system 20 includes a transmitting component configured to transmit a broadcast data frame, such as that depicted in FIG. 3. The broadcast system may be implemented using satellites, terrestrial stations, and the like, to transmit the broadcast data frame. Terminal 10 is an example of a receiving component configured to operate in cooperation with the broadcast system. The terminal may be implemented using a mobile, portable, or fixed digital broadcast terminal configured to receive TV, radio, digital multimedia data, and combinations thereof.

In accordance with an embodiment of the present invention, broadcast system 20 may transmit a broadcast data frame (e.g., FIG type 0/0) which includes reconfiguration version data within the occurrence change field. This reconfiguration version data is often implemented in conjunction with the change flag field being assigned a "0" value.

Terminal 10 is shown having DMB receiver 30, controller 40, and memory 50. The DMB receiver may be configured to receive signaling from broadcast system 20, such signaling including the broadcast data frame of FIG. 3. Memory 30 supports the memory requirements of the terminal, and may be configured to store data relating to current and previous values of the reconfiguration version data. Controller 20 is configured to provide the necessary processing and control signal generation (e.g., channel searching) to support any of the operations discussed above in conjunction with FIG. 4.

Advantages provided by various embodiments include providing notification to the user of a change in ensemble configuration even though the ensemble configuration is not currently being displayed or otherwise presented to the user.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for managing a channel, the method comprising receiving a broadcast data frame comprising version data;

extracting the version data from the received broadcast data frame;

determining that an update is required if a difference exists between the extracted version data and a previously received version data; and performing the required update whenever a value of said extracted version data is different than a value of said previously received version data, and wherein said performing of said required update is accomplished by searching for a new channel responsive to said extracted version data.

2. The method according to claim 1, wherein said broadcast data frame further comprises a change flag, said method further comprising:

initiating said performing of said required update whenever:

the value of said extracted version data is different than the value of said previously received version data, and a value of said change flag is zero.

3. The method according to claim 1, further comprising:

storing said new channel in memory.

4. The method according to claim 1, further comprising:

repeating on a periodic basis the receiving, the extracting, the determining, and the performing.

5. The method according to claim 1, further comprising:

comparing the extracted version data with the previously received version data to determine the difference between the extracted version data and the previously received version data.

6. A digital multimedia broadcast terminal, said terminal comprising:

a receiver for receiving a broadcast data frame comprising an occurrence change field; and a controller configured to generate a control signal causing a service update for said terminal responsive to version data defined within said occurrence change field, and is further configured to generate said control signal whenever a value of said version data is different than a previous value of said version data, and wherein said service update includes searching for a new channel responsive to an extracted version data.

7. The terminal according to claim 6, wherein said broadcast data frame is implemented as a fast information group (FIG) type 0 field for extension 0 frame, and said occurrence change field is 8 bits.

8. The terminal according to claim 7, wherein said broadcast data frame further comprises a change flag, said controller further configured to generate said control signal whenever:

the value of said version data is different than the previous value of said version data, and a value of said change flag is zero.

9. The terminal according to claim 6, wherein said controller is further configured to:
extract said reconfiguration version data from said occurrence change field.

10. The terminal according to claim 6, further comprising: memory for storing said new channel in memory.

11. A digital multimedia broadcasting system, comprising:
a data generator for selectively storing version data within an occurrence change field of a broadcast data frame, wherein a value of said version data is varied to cause a receiving terminal to perform a required update whenever the value of said version data is different than a value of previously received version data, and wherein said performing of said required update is accomplished by searching for a new channel responsive to an extracted version data; and
a transmitter for transmitting said broadcast data frame to said receiving terminal.

12. The system according to claim 11, wherein said broadcast data frame is implemented as a fast information group (FIG) type 0 field for extension 0 frame, and said occurrence change field is 8 bits.

13. The system according to claim 12, wherein said broadcast data frame further comprises a change flag, and wherein said selectively storing said version data is performed by:
defining the value for said version data that is different than the previous value of said version data; and
defining a value of said change flag as zero.

14. The system according to claim 11, wherein said selectively storing said version data is performed by:
defining a value for said version data that is different than the previous value of said reconfiguration version data.

15. The system according to claim 11, wherein said data generator is further configured to:
change the value for said version data to cause said required update.

16. A method for generating a broadcast data frame for a terminal operating within a digital multimedia broadcast system, said method comprising:
defining an occurrence change field in said broadcast data frame; and
varying values of version data defined within said occurrence change field to cause said terminal to perform a required update whenever the value of said version data is different than a value of previously received version data, and wherein said performing of said required update is accomplished by searching for a new channel responsive to an extracted version data.

17. The method according to claim 16, wherein said broadcast data frame is implemented as a fast information group (FIG) type 0 field for extension 0 frame, and said occurrence change field is 8 bits.

* * * * *